United States Patent Office 3,244,729
Patented Apr. 5, 1966

3,244,729
5,8-DIMETHOXY-4-METHYL-6,7-FURANOCOU-MARIN COMPOUNDS
Pierre Luc Georges Eymard, Fontaine, France, assignor to Chemetron Corporation, Chicago, Ill., a corporation of Delaware
No Drawing. Filed Dec. 7, 1962, Ser. No. 242,939
3 Claims. (Cl. 260—343.2)

The present invention relates to derivatives of 5,8-dimethoxy-4-methyl-6,7-furanocoumarin corresponding to the general formula

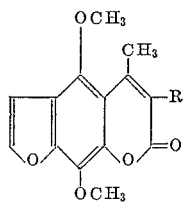

wherein R is a cyano radical or a phenyl radical.

The compounds disclosed in this application have useful physiological properties. They exert a depressive activity on the central nervous system, reduce arterial pressure and affect the diameter of capillaries, 3-cyano-5,8 - dimethoxy - 4 - methyl-6,7-furanocoumarin causing vasoconstriction and 3 - phenyl-5,8-dimethoxy-4-methyl-6,7-furanocoumarin causing vasodilatation of the capillaries of the frog mesentary. The compounds also exhibit antispasmodic activity as shown by a marked and prolonged decrease of tonus of smooth muscle fibers of guinea pig ileum.

PREPARATION

The starting product is khellinone, having the formula:

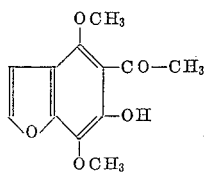

It is obtained by the method described by E. Spath and W. Gruber, Ber. 71B, pp. 106–113 (1938), modified by A. Schonberg and A. Sina, J. Am. Chem. Soc., 72, pp. 1611–1617 (1950).

Starting with khellinone one obtains substituents in the 3-position of 5,8-dimethoxy-4-methyl-6,7-furanocoumarin by reaction with substituted acetic acid esters in the presence of sodium in anhydrous ether. Substituted acetic acid esters which have been used are ethyl cyanoacetate and ethyl phenylacetate. While maintaining the mixture at the boiling point of the ether, small quantities of sodium are added in successive fractions, the heating being continued for several hours. The excess of sodium is eliminated by the addition of anhydrous methanol while continuing the heating until the ebullition produced by the release of hydrogen ceases. An addition of water at 50° C. causes the formation of a cloudy mixture, then the mixture becomes clear and divides into two layers. The synthesized derivative is then isolated by precipitation.

The following examples are presented in order to better describe the present invention. It should be understood that the present invention is not intended to be limited to the precise material and conditions as described therein.

*Example 1.—3-cyano-5,8-dimethoxy-4-methyl-6,7-furanocourmarin*

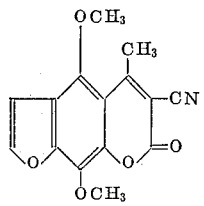

Into a 1-liter glass receiver with a lateral opening, surmounted by a reflux condenser, is introduced 5 g. of khellinone (0.019 mol), 25 g. of ethyl cyanoacetate and 30 ml. of anhydrous ether. The water bath is heated until the ether refluxes. Then 2 g. of sodium is added through the lateral opening; an intense ebullition is produced followed by a clouding of the mixture. The heating is continued at boiling for two hours; then 2 g. of sodium is added anew and heating is continued again for three hours.

The excess of sodium is eliminated by adding through the lateral opening 50 to 70 ml. of anhydrous methanol, and the heating is continued until ebullition ceases. Then 300 ml. of water at 50° C. is added; the mixture clears and separates into two layers, a lower aqueous layer and an upper ethereal layer.

The mixture is poured into a decantation vessel and the ethereal layer separated. In the ethereal layer is an insoluble material; the ether is removed by evaporation and the residue is dried. The clear, aqueous layer is acidified with hydrochloric acid: a yellow precipitate is formed and is separated and dried.

The two products coming from the aqueous layer and from the ethereal layer are combined: these are yellow crystals, melting at 130° C., which contain, as impurities, khellinone and ethyl cyanoacetate. They are washed abundantly with ether which eliminates khellinone is very soluble in ether; the recovered ether is strongly colored orange brown and leaves after evaporation a brown oil, a mixture of ethyl cyanoacetate, khellinone, and methanol.

The crystalline product, 3 - cyano - 5,8 - dimethoxy-4-methyl-6,7-furanocoumarin, is washed once, has a melting point of 210° C.; it is recrystallized in ethanol, which eliminates most of the khellinone, which is quite soluble in the alcohol. The melting point is then from 271 to 272° C. On recrystallizing a second time in benzene a product is obtained that is formed of fine, silky golden yellow needles. Melting point: 273–275° C.; insoluble in ether, chloroform, alcohol, cold benzene, but soluble in hot alcohol, benzene and dioxane.

Yield: 1.80 g., or 30% of theoretical yield calculated on the quantity of khellinone used, or 50% of the theoretical yield if the recovered khellinone is taken into consideration.

The infrared spectrum of 3-cyano-5,8-dimethoxy-4-methyl-6,7-furanocoumarin shows a very sharp absorption band at 4.55 microns. The highest peak of absorption is at 5.81 microns. The ultraviolet spectrum in ethanol had maxima as follows:

| λ | log ε |
|---|---|
| 220 | 4.24 |
| 273 | 4.29 |
| 332 | 4.27 | and minima as follows:

| λ | log ε |
|---|---|
| 254 | 4.02 |
| 294 | 3.74 |

*Example 2.—3-phenyl-5,8-dimethoxy-4-methyl-6,7-furanocoumarin*

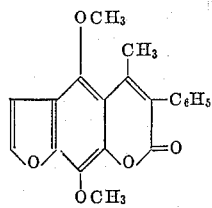

The operation is the same as in Example 1, beginning with 15 g. of khellinone (0.063 mole), 40 g. of ethyl phenyl-acetate and 150 ml. of anhydrous ether.

When the reaction is ended the mixture separates into two layers, a lower oily layer of brown color and an upper, clearer layer. The mixture is poured into a decantation flask and the two layers are separated.

To the upper layer is added petroleum ether; it contains 3 - phenyl-5,8-dimethoxy-4-methyl-6,7-furanocoumarin and unreacted ethyl phenylacetate. The 3-phenyl-5,8-dimethoxy-4-methyl-6,7-furanocoumarin is allowed to crystallize for 12 hours at ordinary temperature in order that the ether evaporates slowly. Then the gray needles of the phenyl derivative which appear in the shape of clusters of needle-like crystals are separated by filtration under vacuum.

In the filtrate a new precipitation is begun again by adding a fresh quantity of petroleum ether and operating as above. These operations are repeated three times, which separates all of the 3-phenyl-5,8-dimethoxy-4-methyl-6,7-furanocoumarin which was formed. The residue consists of ethyl phenylacetate.

The lower layer is acidified with acetic acid. Immediately, a yellow precipitate of unreacted khellinone is formed and an oil consisting of some residues of the reaction are found in the lower part of the precipitation vessel. In order to eliminate this oil the mixture is heated and is poured into a hot decantation vessel, then the oil is separated before cooling. In this way the maximum amount of unreacted khellinone is recovered: 10 g.

The needles of 3-phenyl-5,8-dimethoxy-4-methyl-6,7-furanocoumarin are purified by washing with a large quantity of water, then with ether, and again with water, which eliminates the ethyl phenylacetate which is still present.

Grayish white crystals of 3-phenyl-5,8-dimethoxy-4-methyl-6,7-furanocoumarin are obtained which are recrystallized in alcohol. Melting point: 149° C.; insoluble in water, ether; slightly soluble in petroleum ether, benzene, cold alcohol; very soluble in dioxane.

Yield: 3 g., or 14% of theoretical yield calculated on the basis of the khellinone added or 42% of theoretical yield if the recovered khellinone is taken into account.

PHARMACOLOGICAL PROPERTIES

Substituted 5,8 - dimethoxy-4-methyl - 6,7-furanocoumarins obtained according to the preceding Examples 1 and 2 have been made the object of a comparative pharmacodynamic study to determine the variations of activity as compared with khellin in areas where khellin appears to be particularly interesting, that is to say, as it concerns the central depressive action, the action on arterial tension, the effects of vasodilatation or vasoconstriction, and the action on the tonus of smooth muscle fibers

*Depressive central action.*—The action of the products of this invention has been determined on the spontaneous motor activity of mice by utilizing the apparatus known as the actograph The animal, after administration of the product and a period of rest of a quarter of an hour was placed on the movable flat part of the apparatus which is connected by means of an arm, terminated by a tracing point, to a registering drum turning at a uniform speed of 1.5 mm. per minute. The apparatus was placed in a quite place and the animal undergoing the test was supplied with water at all times. The duration of each experiment was 9 hours.

The tested products being only slightly soluble in water were administered to the mice in the form of suppositories of 0.10 ml. with a dose of 0.30 mg. per animal. Cocoa butter was used as the excipient. The liquefied mass formed by the excipient and the test product was placed in a plastic perfusion tube in which it was allowed to solidify. Then one of the extremities of the tube was connected to an insulin syringe filled with water, and the other extremity was affixed to the beveled end of an injection needle. The other rounded extremity of the needle was introduced into the rectum of the animal held extended on its back, and inserted to a depth of about two centimeters. Then the desired quantity of the mixture was injected by operating the insulin syringe, which gives great operating precision. By taking the precaution of lightly compressing the abdomen of the animal prior to the injection to facilitate the eventual bowel movement, the suppository has never been known to be ejected.

The behavior of each experimental animal on the actograph was studied first without drug, then after treatment with khellin and finally after treatment with the various synthetic products administered in the same dose as khellin.

Finally, to avoid error which may result from an excitation produced, for example, by an unexpected noise, the number of oscillations effected by the movable arm have not been reported, but rather the traces have been compared in their entirety and average values have been assigned to the traces obtained for each product tested on different subjects. Zero value has been assigned to the traces obtained with the control mice, the value 5 to the traces obtained after treatment with khellin and the traces obtained for each substituted furanocoumarin compound have been rated relative to the traces of 0 and 5.

The results are indicated as follows:

Control _____ 0
Khellin _____ 5
3-cyano-5,8-dimethoxy-4-methyl-6,7-furanocoumarin _ 6
3-phenyl-5,8-dimethoxy-4-methyl-6,7-furanocoumarin _ 3

From these results it appears that 3-cyano-5,8-dimethoxy-4-methyl-6,7-furanocoumarin has a stronger depressive effect on the central nervous system than khellin.

*Action on arterial tension.*—The action of the products of the invention have been determined on the arterial pressure of the rabbit. After anesthetizing the animal with diallylmalonylurea an injection tube was inserted in the carotid artery of the rabbit, through the medium of a mercury manometer, with a drum recorder. The test product was injected into the veins of the ear in a form dissolved in a solution of sodium benzoate at 250 mg. per ml. The concentration of the product varied according to its solubility between 12.5 mg. per ml. and 2.5 mg. per 1.5 ml.

The products were administered slowly, and the injection was stopped when a variation of pressure was manifested, thus revealing the threshold of activity of the product. A period of rest of 20 to 30 minutes was observed between each experiment, during the course of which the arterial pressure became normal again, which was expressed by a straight line on the recorder. The results in Table I below give the comparative values of the levels of the traces obtained, in mm.:

TABLE I

| Products Injected | Quantity Injected, mg. | Pressure Drop, mm. | Pressure Increase, mm. |
|---|---|---|---|
| Khellin | 3.33 | 23 | |
| 3-Cyano-5,8-dimethoxy-4-methyl-6,7-furanocoumarin | 0.66 | 20 | |
| 3-Phenyl-5,8-dimethoxy-4-methyl-6,7-furanocoumarin | 10.4 | | 4 |

*Vasodilatation and vasoconstriction.*—The action of the products according to the invention have been studied on the diameter of the capillaries of the frog mesentery. After affixing the frog on its back, an intestinal loop with its mesentery was dissected out and the mesentery was spread out on the stage of a microscope which is fitted with a photographic apparatus.

With the aid of an insulin syringe a certain quantity of test product, dissolved in a solution of sodium benzoate as in the preceding test but in a dose of 1 mg. per ml., was dropped into one or two arterioles and photographs were taken at zero time, 30 sec., 1 min., and 3 min.

The diameters of the treated capillaries were measured on the photographs; the precision of this measurement was ±0.5 mm.; in each case the percentage of increase or decrease in diameter was evaluated.

The results of these tests are reported in Table II below:

TABLE II

| Products administered | Quantity of product deposited on the mesentery, mg. | Diameter of vessel measured on the photographic plate, mm. | | | | Increase or decrease of diameter, percent |
|---|---|---|---|---|---|---|
| | | Time | | | | |
| | | 0 | 30 sec. | 1 min. | 3 min. | |
| Khellin | 1 | 20 | 22 | 23 | 23 | +12 |
| 3-Cyano-5,8-dimethoxy-4-methyl-6,7-furanocoumarin | 1 | 9 | 10 | 11 | 11 | +10 |
| 3-Phenyl-5,8-dimethoxy-4-methyl-6,7-furanocoumarin | 1 | 15 | 13 | 13 | 13 | −14 |

The results obtained by the two preceding methods and given in Tables I and II are quite clear cut; the results in the second table show that the reduction or the increase in arterial pressure is not due to a depression or to an excitation of the heart but rather to a vasodilatation or to a vasoconstriction of the blood vessels.

The first method has shown that occasionally the principal pharmacodynamic effect was preceded by a short period during which the inverse phenomenon was produced.

The only product which has shown an action similar to khellin is 3-cyano-5,8-dimethoxy-4-methyl-6,7-furanocoumarin; moreover, it should be noted that its activity is notably stronger, the indicated results corresponding to a 5 times smaller dose of the furanocoumarin derivative. Its depressive activity, however, is much shorter than that of khellin. The other products have shown an inverse pharmacodynamic activity, that is to say vasoconstrictor.

*Action on the tonus of smooth muscle fibers.*—The products according to the invention have been tested on the ileum isolated from the guinea pig. A 50 ml. vessel was utilized, the products being prepared in the form of solutions containing:

Active compound _____ mg__ 10
Sodium benzoate _____ mg__ 250
Double distilled water _____ ml__ 1

At first the dose of khellin was determined which could be applied on a fresh intestine with an appreciable effect without shocking it too strongly. This dose of 0.2 ml. of solution was selected.

At first each product was tested in a dose of 0.20 ml. of solution in comparison with khellin on the same fragment of ileum. After testing the khellin, the fragment was allowed to rest for 20 to 30 minutes, during which 3 or 4 washings were made, then the product was tested. In order to verify the effect of each product, each product was tested once at a dose of 0.50 ml. of solution on a portion of fresh ileum without previous administration of khellin.

The decreases or increases of tonus indicating a relaxation or contraction of smooth muscle fibers was measured in mm. on the traces. The results of the two series of tests have bene recorded in Tables III and IV below.

TABLE III

[Various guinea pigs: tests on each ileum with khellin and, after rest, with a substituted 5,7-dimethoxy-4-methyl-6,7-furanocoumarin]

| Animals | Products Administered | Doses, mg. | Increase of tonus, mm. | Decrease of tonus, mm. |
|---|---|---|---|---|
| Ileum, Guinea pig No. 4, female 530 g. | Khellin | 2 | 0 | 0 |
| | 3-Cyano-5,8-dimethoxy-4-methyl-6,7-furanocoumarin. | 2 | 0 | 5 |
| Ileum, Guinea pig No. 3, female 600 g. | Khellin | 2 | 1 | 5 |
| | 3-Phenyl-5,8-dimethoxy-4-methyl-6,7-furanocoumarin. | 2 | 1 | 0 |

TABLE IV

[Same animals: tests of substituted 5,8-dimethoxy-4-methyl-6,7-furanocoumarin on fragments of fresh ileum, without prior administration of khellin]

| Animals | Products Administered | Doses mg. | Increase of tonus, mm. | Decrease of tonus, mm. |
|---|---|---|---|---|
| No. 4 | 3-Cyano-5,8-dimethoxy-4-methyl-6,7-furanocoumarin. | 2 | 1 | 0 |
| | | 5 | 5 | 0 |
| No. 3 | 3-Phenyl-5,8-dimethoxy-4-methyl-6,7-furanocoumarin. | 2 | 0 | 0 |
| | | 5 | 3 | 0 |

As in the experiments on arterial pressure, there has been noted, occasionally, a slight and rapid increase of tonus preceding the principal effect which is a marked and prolonged decrease of tonus. For the substituted 5,8-dimethoxy-4-methyl-6,7-furanocoumarin a very transient increase of tonus has been noted which is occasionally marked by a peak at the beginning of the trace.

THERAPEUTIC APPLICATIONS

It will be recalled that khellin was utilized originally for two principal actions:

Coronary vasodilator action
Antispasmodic action of smooth muscle

Later its central depressant and ganglioplegic power was made evident. These two latter therapeutic properties caused it to be utilized as a potentiator of analgesics, hypnotics, and antihistaminics.

The substituted 5,8-dimethoxy-4-methyl-6,7-furanocoumarins of this invention can be substituted, occasionally advantageously, for khellin in this application. In fact, 3-cyano-5,8-dimethoxy-4-methyl-6,7-furanocoumarin has more intense neuroplegic properties than khellin. It could be utilized with advantage in indications of coronary vasodilatation because its action in this area is as intense as that of khellin.

The substituted 5,8-dimethoxy-4-methyl-6,7-furanocoumarins of this invention bring about an increase of tonus of smooth muscle fibers in various degrees, contrary to khellin which brings on decrease of tonus. This property is very interesting because the eliciting of an important muscular relaxation by khellin is objectionable since it generates a sensation of general enfeeblement.

*Therapeutic indications.*—The substituted 5,8-dimethoxy-4-methyl-6,7-furanocoumarins of this invention relax the autonomous system. The indications are:

Neurovegetative dystonias;
Depressive states such as anxiety, hyperemotional, hypernervousness.

In combination with barbiturates, these derivatives are indicated in the following cases:

Profound depressive states with loss of muscular tonus;
Obstinate insomnias;
Extraordinary pains (urethral lithiasis).

In combination with antihistaminics, they will augment their properties by reason of their ganglioplegic power. The indications are:

Asthma;
Common and obstinate coughs;
The five day fevers of whooping cough and their consequences.

*Posology.*—The daily doses may vary according to the indications between 25 and 200 mg.

The pharmaceutical forms may be suppositories, pills, drops, and with the usual vehicles and excipients.

Others may readily adapt the invention for use under various conditions of service, by employing one or more of the novel features disclosed or equivalents thereof. All such which do not depart from the spirit of this disclosure are intended to be within its scope, which at present advised is best defined in the appended claims.

I claim:
1. A compound of the formula

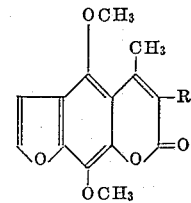

wherein R is selected from the group consisting of phenyl and cyano.

2. 3-phenyl-5,8-dimethoxy-4-methyl-6,7-furanocoumarin.

3. 3-cyano-5,8-dimethoxy-4-methyl-6,7-furanocoumarin.

No references cited.

WALTER A. MODANCE, *Primary Examiner.*
NICHOLAS S. RIZZO, *Examiner.*